United States Patent [19]

Gutschmit

[11] Patent Number: 4,506,429
[45] Date of Patent: Mar. 26, 1985

[54] METHOD FOR PREPARING BELT END PORTIONS FOR SPLICED MECHANICAL INTERCONNECTION, BELT END PORTIONS PREPARED THEREBY AND SPLICED INTERCONNECTION FORMED THEREWITH

[75] Inventor: Alan Gutschmit, Troy, N.C.

[73] Assignee: Alandale Knitting Company, Inc., Troy, N.C.

[21] Appl. No.: 441,116

[22] Filed: Nov. 12, 1982

[51] Int. Cl.³ .......................... B23P 11/02; F16G 3/00
[52] U.S. Cl. ............................................ 29/450; 24/38
[58] Field of Search ................ 29/450, 235; 474/253, 474/254; 24/38, 35, 34

[56] References Cited

U.S. PATENT DOCUMENTS

| | | | |
|---|---|---|---|
| 217,878 | 7/1879 | Kane | 24/35 |
| 752,512 | 2/1904 | Buckley | 24/38 |
| 1,022,080 | 4/1912 | Hay | 474/254 |
| 1,083,544 | 1/1914 | Belle | 24/38 |

Primary Examiner—Howard N. Goldberg
Assistant Examiner—Steven Nichols
Attorney, Agent, or Firm—Richards, Shefte & Pinckney

[57] ABSTRACT

Apparatus and method for preparing belt end portions for mechanical interconnection includes a punch-press and jig assembly for precisely forming a square central opening in one end portion and opposed square side edge openings in another end portion and a cutting arrangement for slitting the one end portion longitudinally from its central opening. The belt end portions are assembled by inserting the another portion through the slit and central opening of the one portion and orienting the transverse extent of the another portion within the central opening.

5 Claims, 9 Drawing Figures

U.S. Patent   Mar. 26, 1985   Sheet 1 of 2   4,506,429
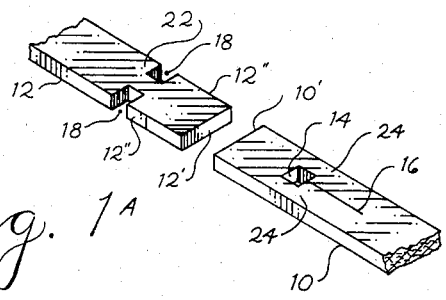
Fig. 1ᴬ
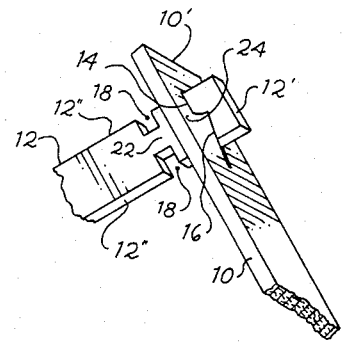
Fig. 1ᴮ
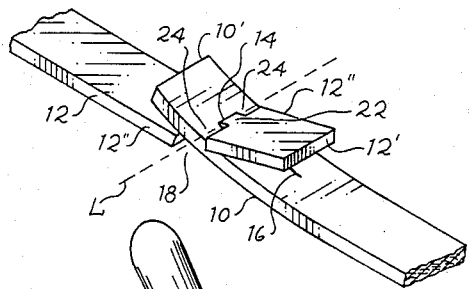
Fig. 1ᶜ
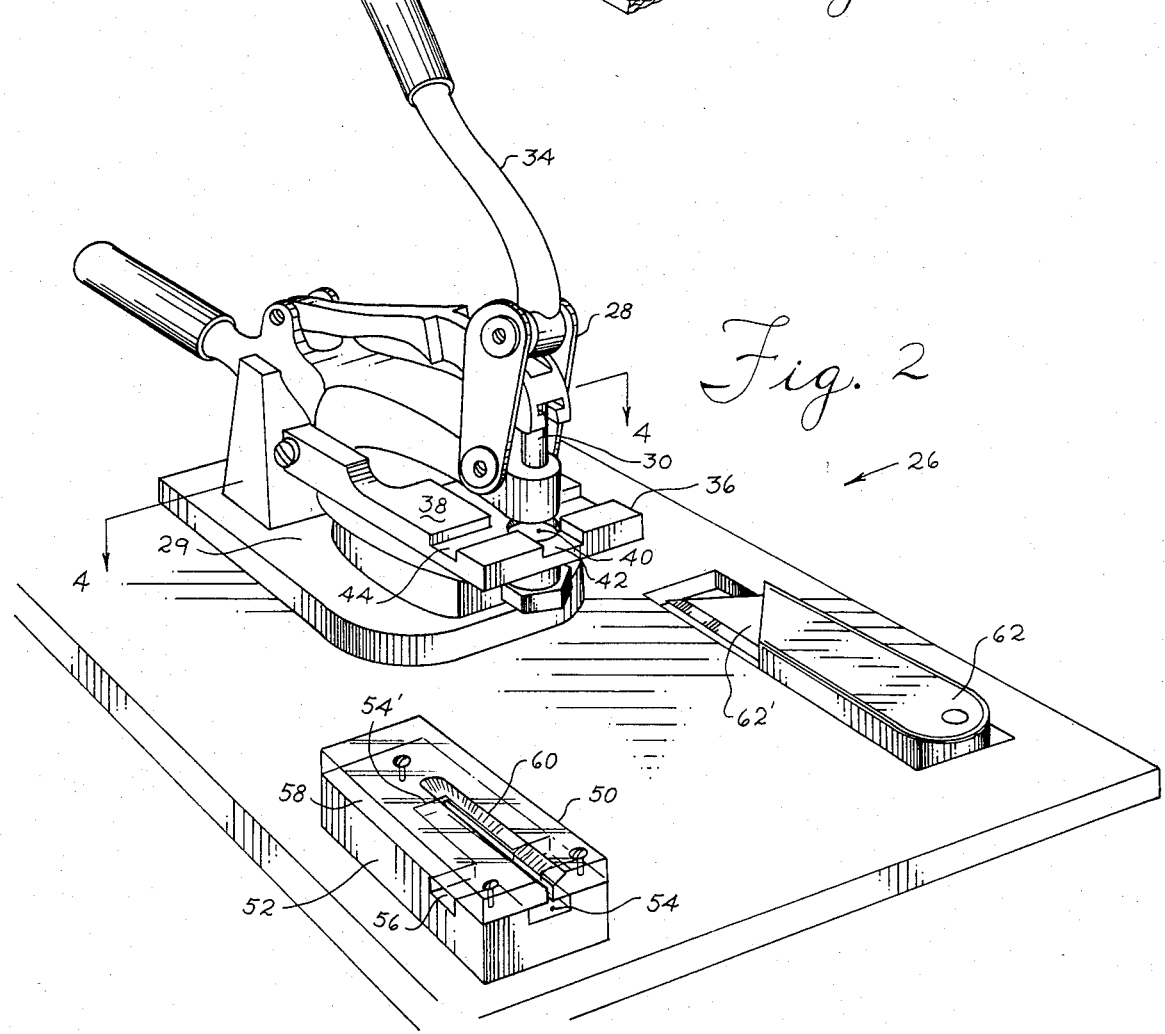
Fig. 2

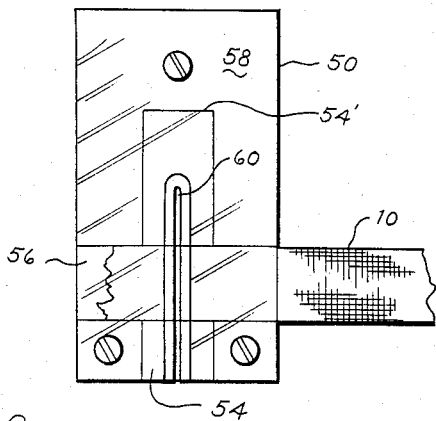
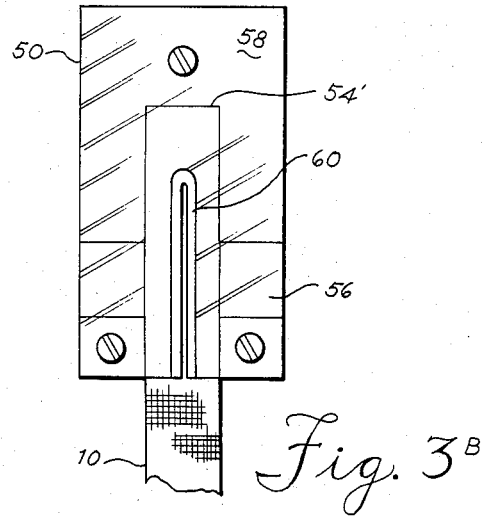
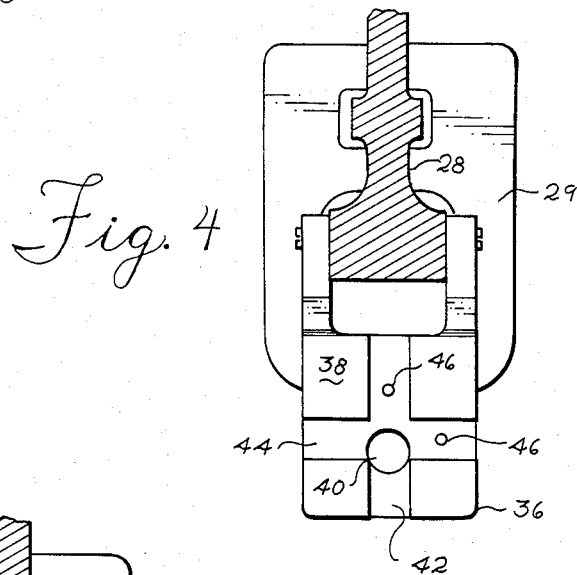
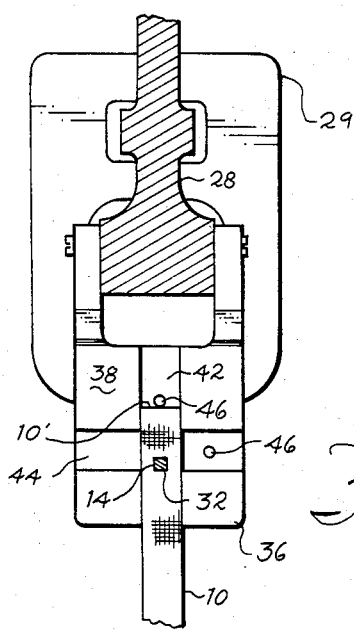
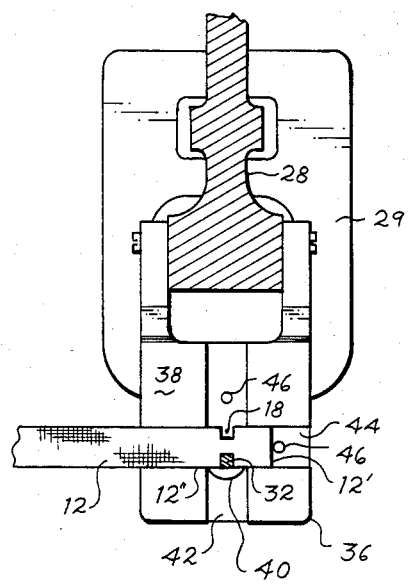

METHOD FOR PREPARING BELT END PORTIONS FOR SPLICED MECHANICAL INTERCONNECTION, BELT END PORTIONS PREPARED THEREBY AND SPLICED INTERCONNECTION FORMED THEREWITH

BACKGROUND OF THE INVENTION

In textile circular knitting machines and in other yarn or strand handling procedures and apparatus, the feeding of yarn is controlled positively through a pulley arrangement driven by an endless belt. Periodically such belts deteriorate and break requiring repair or replacement thereof. The belts typically are formed of a fabric-backed rubber material which is not inexpensive and, therefore, broken belts are not ordinarily discarded but instead are conventionally repaired by splicing thereof through a process of grinding or shaving the belt ends, applying glue thereto, and joining the belt ends while applying heat thereto to bond the belt ends together. This conventional repair procedure has several operational and cost disadvantages. First, a relatively significant initial and ongoing investment of capital is required to be properly equipped to perform the slicing repair procedure in that special grinding and heating machines are required to perform the respective steps of shaving or grinding preparation of the belt ends and heating of the joined belt ends, both of which machines represent a relatively significant initial capital investment and further require periodic maintenance and repair in themselves, and a sufficient supply of appropriate glue is also required, which has a relatively limited shelf life. Additionally, since yarn is fed to conventional circular knitting machines from an overhead creel, it is not possible to install a spliced belt on the machine without taking down all yarn ends leading into the machine from overhead which of course is ordinarily entirely impractical and accordingly it is characteristically necessary that at least the steps of gluing and bonding of the belt ends be carried out at the knitting machine with the belt in place in its operating position. As a result, replacement belts cannot be prepared and inventoried in advance but can only be prepared when needed and at the particular location required. As will be understood, the down time of machines experienced due to broken belts is at least the amount of time required to perform the splicing procedure and can be substantially greater if the belts of more than one machine break at the same time since it is normally not economically justifiable for most textile knitting mills to maintain more than one heat bonding machine. Furthermore, because the conventional splicing procedure is relatively time-consuming and troublesome, it is often typical for mills to discard otherwise usable lengths of broken belts and to replace them with a new belt which requires only one splicing operation rather than splicing several shorter belt lengths.

As a result of these disadvantages, some knitting mills have in recent times begun splicing broken belt ends by an old and well-known system of mechanical interconnection wherein a central opening is cut in one belt end with a longitudinal slit extending therefrom and notches are cut in opposite side edges of another belt end whereby the notched belt end may be inserted through the slit and central opening of the first belt end and the portion of the notched belt end between the notches positioned in the central opening to mechanically interconnect the two belt ends. As will be understood, this mechanical splicing procedure eliminates substantially all of the above-discussed disadvantages of the conventional glue and heat bonding procedure in that no costly machinery or supplies are necessary and the preparation of the belt ends may be performed both quickly and in advance whereby several small belt lengths may be inventoried for quick spliced interconnection at a machine immediately when needed to substantially reduce machine downtime to a minimum. However, certain disadvantages also exist presently with this mechanical splicing procedure in that, to date, this procedure has always been performed by hand in a relatively inexact but otherwise effectively operable manner.

The present invention provides a significant and needed improvement of the mechanical splicing procedure by providing a simple and inexpensive apparatus and method for preparing belt ends in a precise and exact manner for mechanical spliced interconnection of the above-described type.

SUMMARY OF THE INVENTION

Briefly described, the apparatus of the present invention comprises a punch-press arrangement for punching openings in two belt end portions to be interconnected, and a jig mounted on the punch-press for positioning the belt end portions respectively for punching thereof by the punch-press. The jig is provided with two belt-receiving slots, the first slot being arranged centrally relative to the punch-press to orient one belt end portion when received in the first slot for punching an opening in the one belt end portion centrally of its transverse dimension and the second slot being arranged at an offset from the punch-press to orient the other belt end portion when received in the second slot for punching an opening in the other belt end portion in one transverse side edge thereof and to orient the other belt end portion when received oppositely-turned in the second slot for punching an opening in the other belt end portion in its other transverse side edge opposite the first-mentioned side edge opening. The punch-press is adopted to punch openings of a dimension at least approximately one-third of the transverse dimension of the belt end portions and the offset of the second belt-receiving slot is selectively arranged for spacing of the side edge openings a transverse dimension approximately the same as the central opening in the one belt end portion. A cutting arrangement is also provided for cutting a longitudinal slot in the one belt end portion extending from the central opening away from the belt end.

In the preferred embodiment of the present invention, the punch-press is of the type having a reciprocably movable die member and the jig includes a plate disposed in the reciprocal path of the die member, the respective first and second belt-receiving slots of the jig being formed in the plate respectively intersecting the reciprocal path and intersecting one another generally thereat. Each slot is provided with a respective stop member for abutment of the respective belt end portion to dispose it for punching the opening or openings therein at a predetermined distance from the end of the belt end portion. The punch press is adapted for punching openings having at least one straight side, preferably square, and the slots are arranged respectively for orienting the respective belt end portions for punching the opening or openings therein with the straight side of each respective opening most closely adjacent the respective belt end. The cutting arrangement includes a third belt-receiving slot for receiving the one belt end portion, a cutting edge for cutting engagement thereof, and a guide surface extending longitudinally of the third slot for guiding cutting movement of the cutting edge longitudinally of the one belt end portion when disposed in the third slot. A second cutting arrangement is provided for preliminarily cutting each belt end portion substantially perpendicularly transverse to the longitudinal extent thereof to provide substantially squared belt ends.

According to the present method, the punch-press is initially operated to form the central and side edge openings in their respective belt end portions and the longitudinal slit is formed in the one belt end portion to prepare the belt end portions for mechanical interconnection. The belt end portions are mechanically interconnected by inserting the other belt end portion through the slit and central opening of the one belt end portion and positioning the transverse extent of the other belt end portion between its side edge openings transversely within the central opening of the one belt end portion. In the preferred method, the belt end portions are initially cut substantially perpendicularly to their longitudinal extents to provide substantially squared belt ends. In the step of inserting and positioning the other belt end portion in the slit and central opening of the one belt end portion, the transverse extent of the other belt end portion between its side edge openings is positioned in contacting engagement with the straight side of the central opening of the one belt end portion and the straight edges of the side edge openings of the other belt end portion are positioned in contacting engagement with the transverse extents of the one belt end portion adjacently transversely outwardly of the central opening thereof.

BRIEF DESCRIPTION OF THE DRAWINGS

FIGS. 1A, 1B and 1C are perspective views of two mating belt end portions prepared for mechanical interconnection according to the present invention illustrating such belt end portions in sequential states of assembly;

FIG. 2 is a perspective view of the apparatus of the present invention for preparing the belt end portions of FIGS. 1A, 1B and 1C;

FIGS. 3A and 3B are top plan views of the cutting arrangement of the apparatus of FIG. 2 respectively showing it in operation for squaring a belt end portion and in operation for cutting a longitudinal slit in a belt end portion;

FIG. 4 is a horizontal cross-sectional view of the punch-press arrangement of the apparatus of FIG. 2 taken along line 4—4 thereof; and FIGS. 5A and 5B are horizontal cross-sectional views of the punch-press arrangement similar to FIG. 4 respectively showing it in operation for punching a central opening in one belt end portion and in operation for punching a side edge opening in another belt end portion.

DESCRIPTION OF THE PREFERRED EMBODIMENT

Referring now to the accompanying drawings and initially to FIGS. 1A, 1B and 1C, two end portions 10,12 of two respective lengths of belting (or of a single length of belting) are illustrated in the preferred form prepared according to the apparatus and method of the present invention in sequential stages of assembly. The belts (or belt) are of the conventional type characteristically employed in an endless form of relatively large diameter about the creel of a large diameter circular knitting machine for driving the respective pulley wheels of the positive yarn feeding arrangement associated with each yarn feeding station on the knitting machine, as will be understood by those skilled in the art, the belts being of a relatively small widthwise dimension and formed of rubber or a similar base material which is generally pliable with the base material being backed on either side by a coated woven fabric. However, it will be understood from the following specification of the present invention that it is not limited in scope to such particular belting material but instead is susceptible of a broad utility with substantially any type of belting.

Each belt end portion 10,12 is squared at its end to provide an end edge 10',12' substantially perpendicularly to the longitudinal extent of the respective belt end portion 10,12. The belt end portion 10 has an opening 14 formed therein at a relatively small spacing from the end edge 10' of the belt end substantially centrally of the widthwise transverse extent of the belt end portion 10. A substantially linear slit 16 is also formed in the belt end portion 10 extending longitudinally thereof from the central opening 14 away from the end edge 10'. The belt end portion 12 has two openings 18 formed therein at a small spacing from the end edge 12' as notches in the transverse side edges 12" of the belt end portion 12 in transverse opposition to one another. The central opening 14 in the belt end portion 10 is of a dimension transversely thereof at least, and preferably the same as, approximately one-third of the transverse dimension of the belt end portion 10 and each side edge opening 18 in the belt end portion 12 is of a selected transverse dimension, also preferably approximately one-third of the transverse dimension of the belt end portion 12, such that the remaining transverse extent of the belt end portion 12 indicated at 22 is of substantially the same transverse dimension as the central opening 14 in the belt end portion 10. Each of the central opening 14 and the side edge openings 18 preferably have a substantially straight linear side 14',18' respectively at the location of the respective opening most closely adjacent the respective end edge 10',12' and extending substantially parallel thereto, the openings 14,18 preferably being substantially square in shape for this purpose. The longitudinal slit 16 and the central opening 14 in the belt end portion 10 are of a combined dimension longitudinally thereof at least slightly greater than the widthwise transverse dimension of the belt end portion 12.

It will therefore be understood that the belt end portions 10,12 may be mechanically interconnected by orienting the belt end portion 12 in a disposition with the transverse widthwise extent of its end edge 12' aligned with the longitudinal extent of the slit 16 and central opening 14 of the belt end portion 10, inserting the belt end portion 12 through the slit 16 and central opening 14 to dispose the transverse portion 22 of the belt end portion 12 in the slit 16, and sliding the transverse portion 22 into the central opening of the belt end portion 10 and positioning the transverse portion 22 transversely therein. The transverse portion 22, being of approximately the same dimension as the central opening 14, thusly fits snugly therein and, as will be understood, when the belt end portions 10,12 as so assembled are pulled taut as illustrated in FIG. 1C, the straight sides 14',18' of the openings 14,18 align with one another to bring the respective belt end portions 10,12 into secure engagement along a line L of substantially continuous engagement extending transversely of each thereof with the straight side 14' of the opening 14 of the belt end portion 10 engaged in contact with the transverse portion 22 of the belt end portion 12 and with the straight sides 18' of the openings 18 of the belt end portion 12 engaged in contact with the portions 24 of the belt end portion 10 transversely outwardly of the central opening 14 thereof. In this manner, the mechanical interconnection thusly provided between the belt end portions 10,12 is substantially as strong as the more conventional glue-and-heat-bonded splices described hereinabove and leaves the rearward sides of the belt end portions 10,12 at the location of interconnection sufficiently smooth for satisfactory operation in driving positive yarn feed devices.

The apparatus of the present invention for preparing belt end portions in the form of portions 10,12 for mechanical interconnection is indicated in FIG. 2 generally at 26 and includes a punch-press device 28 of the conventional type such as that manufactured and sold by Roper-Whitney, Inc., of Rockford, Ill., under the model designation 590005501. The punch press 28 includes a frame 29 on which a slide assembly 30 is mounted for vertical reciprocatory movement which slide assembly 30 carries a square die member 32 for punching square openings of the desired dimension for the openings 14,18 above-described and the punch-press 28 also includes a handle 34 pivotably mounted in association with the slide assembly 30 for actuation of its reciprocatory movement, all as is conventional. According to the present invention, a jig 36 is horizontally mounted on the frame 29 in the path of vertical reciprocal movement of the slide assembly 30 and is constructed for properly positioning belt end portions for punching square openings therein as required for the aforedescribed belt end portions 10,12. More specifically, the jig 36 includes a plate 38 having a circular opening 40 formed therein concentrically with the longitudinal centerline of reciprocal movement of the slide assembly 30, the plate 38 having two belt-receiving linear slots 42,44 formed therein of substantially the same transverse dimension as the belt end portions 10,12 thereby for receiving such belt end portions and the slots 42,44 respectively intersecting the opening 40 for positioning belts received in the slots 42,44 relative to the reciprocal path of the slide assembly 30 for punching openings in the belts at the locations desired for openings 14,18. Thus, the belt-receiving slot 42 is arranged with its longitudinal centerline intersecting the centerline of reciprocal movement of the slide assembly 30 such that a belt received in the slot 42 will be oriented to be engaged by the die 32 centrally of the transverse extent of the belt for punching central openings 14 therein. The belt-receiving slot 44, on the other hand, is arranged with its longitudinal centerline offset from the longitudinal centerline of reciprocal movement of the slide assembly 30 such that a belt received in the slot 44 will be oriented to be engaged by the die 32 at one side edge of the belt for punching a transverse side edge opening 18 therein. A stop member 46 is provided in each slot 42,44 for abutment by the end edge of a belt positioned therein so as to position the belt for punching of the desired opening 14 or 18 at a predetermined spacing from the belt's end edge.

The apparatus 26 also includes a belt cutting arrangement 50 which includes a plate member 52 in which are formed intersecting perpendicularly-arranged belt-receiving linear slots 54,56 each being of substantially the same transverse dimension as the belt end portion 10,12. A cover plate 58 of a clear plastic material is affixed over the plate member 52 and includes a linear slit 60 therethrough extending parallel to and directly above the longitudinal centerline of the slot 54. The slit 60 is of a sufficient width to receive and guide a conventional cutting edge such as a razor or knife blade, the present apparatus 26 including a conventional razor-blade holding cutting device 62, the razor blade 62' of which may be inserted through the slit 60 to engage a belt end portion disposed in either of the slots 54,56. In this manner, a longitudinal slit 16 may be readily and precisely cut in a belt end portion by insertion of it in the slot 54 following the formation of a central opening 14 in the belt end portion and operating the cutting device 62 through the guiding slit 60 to engage the belt end portion and to cut the desired slit 16 away from the central opening 16 (FIG. 3B). Similarly, the cutting arrangement 50 also facilitates squaring off the end of any belt end portion to be spliced which is torn or otherwise has an irregular end edge, such squaring being accomplished by inserting the belt end portion in the slot 56 to an extent sufficient to extend beyond the slit 60, whereby the belt end portion is oriented perpendicularly to the slit 60, and operating the cutting device 60 through the guiding slit 60 to engage the belt end portion and to cut therefrom the portion thereof extending beyond the slit 60, thereby leaving the belt end portion with a substantially squared end edge 10' or 12' (FIG. 3A).

The operation of the present apparatus for preparing belt end portions according to the present invention will thus be understood. Initially, if necessary, any belt end portion having an irregular end edge is squared in the manner just described by insertion in the cutting arrangement slot 56 and cutting off the irregular end of the belt end portion by operating the razor edge of the cutting device 62 through the slit 60. One belt end portion is then inserted in the slot 42 of the jig plate 38 and abutted against the stop member 46 of the slot 42 and the punch-press 28 is operated to punch an opening in the belt end portion centrally of its transverse extent at a small spacing from its end edge (FIG. 5A). The belt end portion is then inserted in the cutting arrangement slot 54 and abutted against the end stop surface 54' thereof and the razor edge 62' of the cutting device 62 is operated through the slit 60 to cut a slit in the belt end portion longitudinally thereof away from the central opening just formed therein, whereupon the belt end portion is prepared in the form of a belt end portion 10. Another belt end portion is next inserted into the slot 44 into abutment against the stop member 46 thereof and the punch-press 28 is operated to punch an opening in the leftward-facing transverse side edge of the belt end portion at a small spacing from its end edge. The belt end portion is then turned about its longitudinal extent to be oppositely-received in the slot 44 with its other transverse side edge facing leftward and with its end edge still in abutment with the stop member 46 and the punch-press 28 is operated to punch an opening in such other transverse side edge of the belt end portion at the same spacing from the end edge as, and transversely opposite from, the first side edge opening, whereby the belt end portion is prepared in the form of a belt end portion 12 (FIG. 5B). The thusly prepared belt end portions 10,12 may accordingly then be assembled by mechanical interconnection in the manner hereinbefore fully described.

The advantages of the basic form of mechanical splice produced by the present invention will be readily recognized by those skilled in the art. The preparation and splicing of the belt end portions may be accomplished quickly and easily without costly complex special machinery or equipment. Furthermore, since the preparation of the belt end portions and the spliced assembly thereof are separate steps with the actual mechanical assembly being performed by hand, the preparation of belt end portions may be performed in advance at a location remote from the knitting machines on which they will ultimately be used, thereby permitting the establishment of an inventory of replacement belts so that machine downtime resulting from broken belts is negligible and substantially inconsequential. The method and apparatus of the present invention provide important additional advantages in that the preparation of belt end portions may now be machanized in a simplistic manner through the use of the inexpensive and simple punch-press apparatus enabling the preparation of belt end portions to be accomplished in a precise, exact manner repetitively. Thus, in contrast to splices between belt end portions prepared by hand, the mechanical interengagement of belt end portions prepared according to the present invention resultantly provides substantially continuous surface contact between the prepared belt end portions in their assembled form along the aforedescribed line L of the contacting straight sides of their respective openings to produce a strong and reliable splice.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A method of preparing two belt end portions for mechanical interconnection thereof comprising the steps of cutting each said belt end portion substantially perpendicularly to the longitudinal extent thereof to provide substantially squared belt ends, providing press means for punching openings of a substantially square shape in said belt end portions of an edgewise dimension at least approximately one-third of the transverse dimension of said belt end portions, operating said press means to form an opening in one belt end portion centrally of the transverse dimension thereof with one straight edge of said central opening oriented transversely to the longitudinal extent of said one belt end portion in substantially parallel relation to its said squared belt end, forming a slit in said one belt end portion extending longitudinally from said central opening away from the belt end, and operating said press means to form transversely opposed openings in opposite transverse side edges of the other belt end portion spaced a transverse dimension approximately the same as said central opening with one straight edge of each said opposed opening oriented transversely to the longitudinal extent of said other belt end portion in substantially parallel relation to its said squared belt end, whereby said belt end portions may be mechanically interconnected by inserting said other belt end portion through said central opening and said slit of said one belt end portion and positioning the transverse extent of said other belt end portion between its side edge openings transversely within said central opening.

2. Belt end portions for mechanical interconnection thereof prepared according to the method of claim 1.

3. A method of splicing two belt end portions by mechanical interconnection thereof comprising preparing said two belt end portions according to the method of claim 1 and mechanically interconnecting said belt end portions by performing said inserting and positioning.

4. The method of claim 3 and characterized further in that said inserting and positioning said other belt end portion includes positioning said transverse extent of said other belt end portion in contacting engagement with the straight side of said central opening of said one belt end portion and positioning said straight edges of said side edge openings of said other belt end portion in contacting engagement with the transverse extents of said one belt end portion adjacently transversely outward of said central opening thereof.

5. A spliced interconnection of two belt end portions produced according to the method of claim 3.

* * * * *

UNITED STATES PATENT OFFICE
CERTIFICATE OF CORRECTION

Patent No. 4,506,429    Dated March 26, 1985

Inventor(s) Alan Gutschmit

It is certified that error appears in the above-identified patent and that said Letters Patent are hereby corrected as shown below:

Column 2, Line 3, after "costly" insert -- special -- .

Signed and Sealed this

Fourth Day of March 1986

[SEAL]

Attest:

Attesting Officer

DONALD J. QUIGG

Commissioner of Patents and Trademarks